(12) United States Patent
Koskela et al.

(10) Patent No.: US 11,923,945 B2
(45) Date of Patent: Mar. 5, 2024

(54) FACILITATING EFFICIENT MULTI-BEAM BEAM RECOVERY

(71) Applicant: Nokia Technologies Oy, Espoo (FI)

(72) Inventors: Timo Koskela, Oulu (FI); Jorma Kaikkonen, Oulu (FI); Sami-Jukka Hakola, Kempele (FI); Samuli Turtinen, Ii (FI); Juha Karjalainen, Oulu (FI); Mihai Enescu, Espoo (FI)

(73) Assignee: Nokia Technologies OY, Espoo (FI)

( * ) Notice: Subject to any disclaimer, the term of this patent is extended or adjusted under 35 U.S.C. 154(b) by 492 days.

(21) Appl. No.: 17/272,797

(22) PCT Filed: Sep. 4, 2019

(86) PCT No.: PCT/FI2019/050626
§ 371 (c)(1),
(2) Date: Mar. 2, 2021

(87) PCT Pub. No.: WO2020/049216
PCT Pub. Date: Mar. 12, 2020

(65) Prior Publication Data
US 2021/0320710 A1  Oct. 14, 2021

Related U.S. Application Data

(60) Provisional application No. 62/728,177, filed on Sep. 7, 2018.

(51) Int. Cl.
*H04B 7/06* (2006.01)
*H04B 17/309* (2015.01)
(Continued)

(52) U.S. Cl.
CPC ......... *H04B 7/0695* (2013.01); *H04B 17/309* (2015.01); *H04W 24/02* (2013.01); *H04W 24/08* (2013.01); *H04B 7/0413* (2013.01)

(58) Field of Classification Search
CPC ... H04B 7/0695; H04B 17/309; H04W 24/02; H04W 24/08
(Continued)

(56) References Cited

U.S. PATENT DOCUMENTS

2018/0097547 A1  4/2018 Turtinen et al.
2018/0191422 A1  7/2018 Xia et al.
(Continued)

FOREIGN PATENT DOCUMENTS

WO  WO 2017/214969 A1  12/2017

OTHER PUBLICATIONS

"Summary of remaining issues on beam failure recovery", Huawei, HiSilicon, 3GPP TSG RAN WG1 Meeting #92bis, R1-1803637, Apr. 2018, 13 pages.
(Continued)

*Primary Examiner* — Faisal Choudhury
(74) *Attorney, Agent, or Firm* — Barta Jones, PLLC (57) ABSTRACT

A method includes determining whether a downlink beam signal is being received from a base station (502); when the downlink beam signal is being received from the base station, determining whether a measurable property of the downlink beam signal does not meet a preselected threshold (504); when the downlink beam signal is not being received from the base station or when the measurable property of the downlink beam signal does not meet the preselected threshold, transmitting a message to the base station indicating that at least one uplink beam corresponding to the downlink beam has failed (506); and receiving a reply message from the base station with information required to determine a new uplink beam (508). An alternative method includes determining whether at least one uplink beam signal is being received from a user equipment (602); determining whether a measurable property of the at least one uplink beam signal does not meet a preselected threshold, when the at least one uplink beam signal is being received from the user equipment (604); and transmitting a message to the user equipment to initiate uplink beam recovery, when at least one uplink beam signal is not being received from the user equipment or when the measurable property of the at least one uplink beam signal does not meet the preselected threshold (606).

20 Claims, 6 Drawing Sheets

(51) Int. Cl.
*H04W 24/02* (2009.01)
*H04W 24/08* (2009.01)
*H04B 7/0413* (2017.01)

(58) Field of Classification Search
USPC .......................................................... 370/329
See application file for complete search history.

(56) References Cited

U.S. PATENT DOCUMENTS

| | | |
|---|---|---|
| 2018/0227899 A1 | 8/2018 | Yu et al. ............................ 72/46 |
| 2018/0249526 A1 | 8/2018 | Nagaraja et al. |
| 2018/0278467 A1* | 9/2018 | John Wilson ......... H04W 72/21 |
| 2020/0045745 A1* | 2/2020 | Cirik ..................... H04W 76/11 |
| 2020/0128587 A1* | 4/2020 | Qian .................. H04W 56/0045 |
| 2020/0145079 A1* | 5/2020 | Marinier ........... H04W 56/0045 |

OTHER PUBLICATIONS

3GPP TSG-RAN WG1 #85, Nanjing, China, May 23-27, 2016, R1-164874, "Beam-based design framework for New Radio", Interdigital Communications, 5 pgs.

* cited by examiner

FACILITATING EFFICIENT MULTI-BEAM BEAM RECOVERY

CROSS REFERENCE TO RELATED APPLICATION

This patent application is a U.S. National Stage application of International Patent Application Number PCT/FI2019/050626 filed Sep. 4, 2019, which is hereby incorporated by reference in its entirety, and claims priority to U.S. provisional application 62/728,177 filed Sep. 7, 2018, which is hereby incorporated by reference in its entirety.

TECHNICAL FIELD

This disclosure relates to a 5G new radio (NR) mobile communication system for above 6 GHz radio frequency (RF) bands, but is not limited to such a system. More specifically, this disclosure concerns beam recovery in a multi-beam environment and, in particular, on uplink beam failure recovery.

BACKGROUND

The present invention is related to 3GPP new radio (NR) physical layer design. More specifically, the focus is on NR operation in the cm-Wave and mm-Wave bands, in general, bands above 6 GHz. A typical characteristic for cm-Wave and mm-Wave operation is a beam-based access, where both a gNB and a UE operate using narrower transmit and receive beams than sector-wide and omni-directional beams, respectively, due to a high-array gain required to compensate for higher path loss, but also because of technological constraints favoring distributed power amplifier (PA) architectures.

The use of narrow beams at both ends of the links between the gNB and the UE improves the link budget, but, as a consequence, the links are more sensitive to blocking and, thus, specific procedures and methods are needed to enable fast realignment or re-establishment of a beam pair between the gNB and the UE. One of the most important procedures of this type is beam recovery—a procedure in which a beam failure is detected and a new beam pair link is established without any need to declare a radio link failure. In the following, the current state of the art related to beam recovery is reviewed.

1. Beam Failure Detection RS

The network can configure the UE with a set of reference signals (RS) for monitoring the quality of a link. The set of reference signals may be referred as q0 or beam failure detection reference signals (BFD-RS). Typically, BFD-RSs are configured to be spatially quasi collocated (QCL'd) with physical downlink control channel (PDCCH) demodulation reference signals (DMRS), that is, these reference signals correspond to downlink beams used to transmit PDCCH. Downlink beams are identified by a reference signal, either synchronization signal physical broadcast channel (SS/PBCH or SSB) block index or channel state information reference signal (CSI-RS) resource index. SS/PBCH block may comprise of synchronization signals such as PSS and SSS (primary, secondary synchronization signals) and PBCH (Physical Broadcast Channel) including PBCH-DMRS (demodulation reference signals). The network may configure the beam failure detection reference signal (BFD-RS) list using radio resource control (RRC) signaling or it may be possible to define a way to use combined RRC+ medium access control (MAC) control element (CE) signaling, where specific RRC configured signals are activated using a MAC CE. When the UE is not explicitly configured with a BFD-RS list, it determines the BFD-RS resources implicitly based on the configured, indicated, or activated PDCCH transmission configuration indication (TCI) states per CORESET (Control Resource Set, set of physical resources used to transmit downlink control channel), that is, the downlink reference signals (CSI-RS, SS/PBCH block) which are QCL'd with PDCCH DMRS, or, in other words, PDCCH beams. In general, when two different signals share the same QCL type, they share the same indicated properties. As an example, the QCL properties may be, for example, delay spread, average delay, Doppler spread, Doppler shift, spatial RX. QCL type A means Doppler spread, Doppler shift, delay spread, and/or average delay, and QCL type D means spatial RX. As an example the current TS 38.214 lists following QCL types:

'QCL-TeA': {Doppler shift, Doppler spread, average delay, delay spread}
'QCL-TeB': {Doppler shift, Doppler spread}
'QCL-TeC': {Doppler shift, average delay}
'QCL-TeD': {Spatial Rx parameter}

As a further example if a CSI-RS and SSB have the type D QCL assumption between each other, it means that UE may utilize same RX spatial filter (beam) to receive these signals.

2. Declaring Beam Failure

The physical layer periodically assesses the quality of the radio link based on BFD-RS in the set of q0. Typically, the whole set of q0 is evaluated but the link quality evaluation may also be limited to RS that are QCL'd with PDCCH DMRS. Assessment is done per BFD-RS and, when the radio link condition of each BFD-RS in the beam failure detection set is considered to be in failure condition, that is, the hypothetical PDCCH block error rate (BLER) estimated using the RS is above a configured threshold, a beam failure instance (BFI) indication is provided to a higher layer (MAC). One example of a BLER threshold value may be the out-of-sync (OOS) threshold used for radio link monitoring OOS/Qout=10%. Evaluation and indication is done periodically. In case the at least one BFD-RS is not in failure condition, no indication is provided to the higher layer.

The MAC layer implements a counter to count the BFI indications from the physical layer (PHY), and, if the BFI counter reaches a maximum value configured by the network, a beam failure is declared. The counter can be configured to be supervised by a timer: each time MAC receives a BFI indication from a lower layer, a timer is started. Once the timer expires, the BFI counter is reset; that is to say, the counter value is set to zero.

3. Candidate RS (Beam) List

The network may provide the UE with a list of candidate RSs for recovery that can be indicated using dedicated signals. Candidate beam Layer 1-reference signal received power (L1-RSRP) measurements may be provided to the MAC layer, which performs the selection of a new candidate and determines the uplink resources to indicate the new candidate to the network. The network may configure the UE with dedicated signaling resources, such as physical random access channel (PRACH) resources, that are candidate beam specific; that is, the UE can indicate the new candidate by sending a preamble. This set of candidate beams or reference signals corresponding to candidate beams may be referred to as set of q1.

4. Beam Failure Recovery Request

A beam failure recovery procedure is initiated when the UE has declared beam failure and has detected a new candidate beam or beams based on physical layer measurements, such as L1-RSRP measurements on downlink reference signals (CSI-RS/SSB). A dedicated signal, such as one from the PRACH pool, which can be referred to as a BFR resource or contention-free random access (CFRA) resource, although it has to be noted that the beam recovery procedure differs slightly from a random access (RA) procedure when it comes to the gNB response to preamble reception, is configured per candidate RS in the Candidate-Beam-RS-List (q1). A specific threshold may be configured so that, when any of the new candidates, based on L1-RSRP measurements, are above the threshold, they can be indicated using a dedicated signal (set of resources in set q1). The UE selects a candidate beam from that set and, in case there are no beams above the configured threshold, the UE utilizes contention-based signaling to indicate the new candidate, where contention-based random access (CBRA) preamble resources are mapped to specific downlink RSs.

The UE monitors network response to BFRR/BFRQ (Beam Failure Recovery Request), during the beam recovery response window, which is similar to a random access response (RAR) window, using the same beam alignment, that is, the same beam direction that was used for the transmitter (TX) is used for the receiver (RX), for transmitting the recovery signal; it expects the network to provide the response using a beam that is spatially QCL'd with the indicated downlink reference signal. A case where this correspondence does not hold is not yet defined.

In case of contention-free signaling used for beam recovery purposes, the UE expects the network to respond to the UE using a cell radio network temporary identifier (C-RNTI) instead of random access radio network temporary identifier (RA-RNTI) when a contention-free random access (CFRA) procedure is used. For CFRA BFR, the UE monitors PDCCH (for C-RNTI and specific DCI format) based on a dedicated search space configuration. This is referred as search-space-BFR. Search space configuration determines, for example, the PDCCH monitoring pattern for the associated CORESET. Search-space-BFR is only monitored during the network/gNB response window, after transmission of CFRA for BFR. In case CBRA resources are used for beam failure recovery, the UE currently expects a response as it normally does in the RA procedure. CBRA procedure currently does not explicitly indicate that the RA procedure is for beam failure recovery (it may be determined by the network, for example, based on UE ID); it may be possible to define signaling to indicate BFRR during CBRA procedure. This may also alter the CBRA recovery procedure, for example, in terms of network response to BFRR.

5. TCI Framework

In downlink, a so-called TCI framework is defined to provide information about the TX beams to be used, and correspondingly assist the UE to set its receive beam properly when receiving the downlink transmission. The UE may be configured with one or multiple TCI states, where each TCI state at above 6 GHz has an associated reference signal which provides a quasi co-location type D (QCL Type-D) parameter. QCL type-D is defined to provide the spatial domain characteristics of the RS. The associated reference signal can be SS/PBCH block or CSI-RS. For PDCCH, the UE can have one active TCI state per CORESET—the UE can be configured for up to 3 CORESETs—and, for PDSCH, the UE may have up to eight (8) active TCI states representing eight (8) candidate beams from which the gNB can select one dynamically via downlink control information (DCI) for the scheduled DL transmission. Different TCI states may represent TX beams of different transmission/reception points (TRPs) of the cell.

Figure 1:
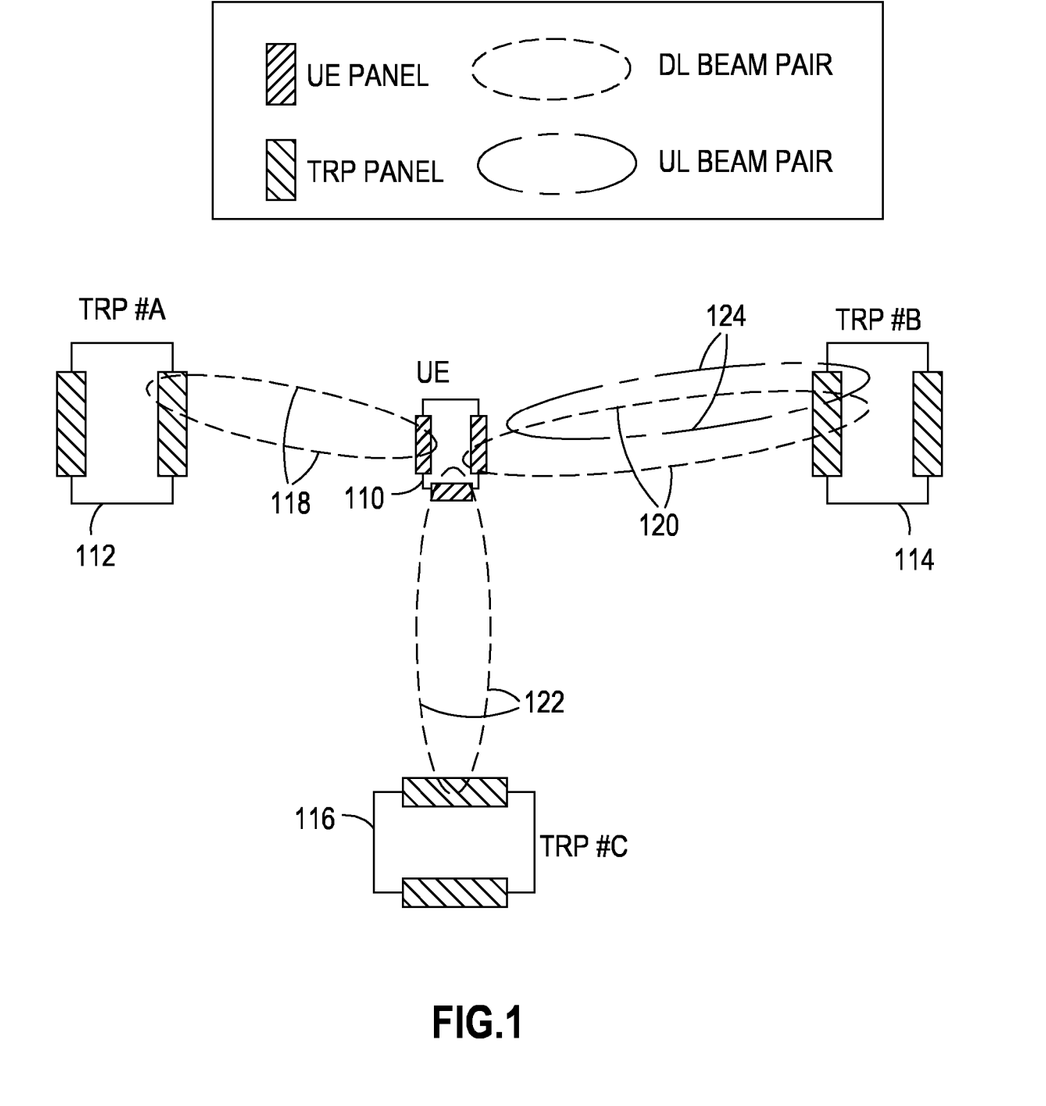
FIG. 1 schematically illustrates a problem scenario addressed by the present invention.

However, a problem scenario is illustrated schematically in FIG. 1, where UE 110 is in the coverage area of three transmission/reception points 112, 114, 116 of the same cell. The transmission points 112, 114, 116 may alternatively belong to different cells. The UE 110 has one DL beam pair link 118, 120, 122 to each of the transmission/reception points 112, 114, 116, but only one UL link 124 toward transmission/reception point 114. As far as the uplink is concerned, this is the typical case since, even though the UE can be configured for multiple physical uplink control channel (PUCCH) resources, the spatial relation information configured for them, that is, a transmit beam, is the same. That is because the multiple PUCCH resources are defined to enable flexibility for PUCCH resource allocation, but not for enabling use of multi-beam PUCCH.

Currently, in new radio (NR), beam failure detection and recovery only considers downlink failure, that is, the PDCCH failure; uplink failure is not explicitly determined. In addition, in NR, determining the indication of a beam failure instance to a higher layer by L1 requires all the BFD-RS (in the set of q0) to be in failure condition, and, thus, the UL direction is not considered explicitly, and, thus, no signaling or mechanism is specified. Also, the partial beam failure, where only subsets of BFD-RS are in failure condition, is not considered in current NR specifications.

In the example scenario shown in FIG. 1, when the link toward TRP #B 114 fails, that is, when both the DL link 120 and the UL link 124 fail, the UE does not trigger any beam failure recovery, since the other links are considered not to be in failure. In case the failed link would have been, for example, TRP #A 112, the UE 110 could indicate the partial link failure using UL signaling on the UL link 124. However, since link B has the only UL link 124 configured for the UE 110, the failure should be declared and recovery procedure initiated.

Uplink beam failure, in case of link reciprocity, may be determined by UE 110 by determining the link quality on DL RS (SSB/CSI-RS).

This problem scenario is not considered in either 3GPP TS 38.213 or 3GPP TS 38.321.

Figure 2:
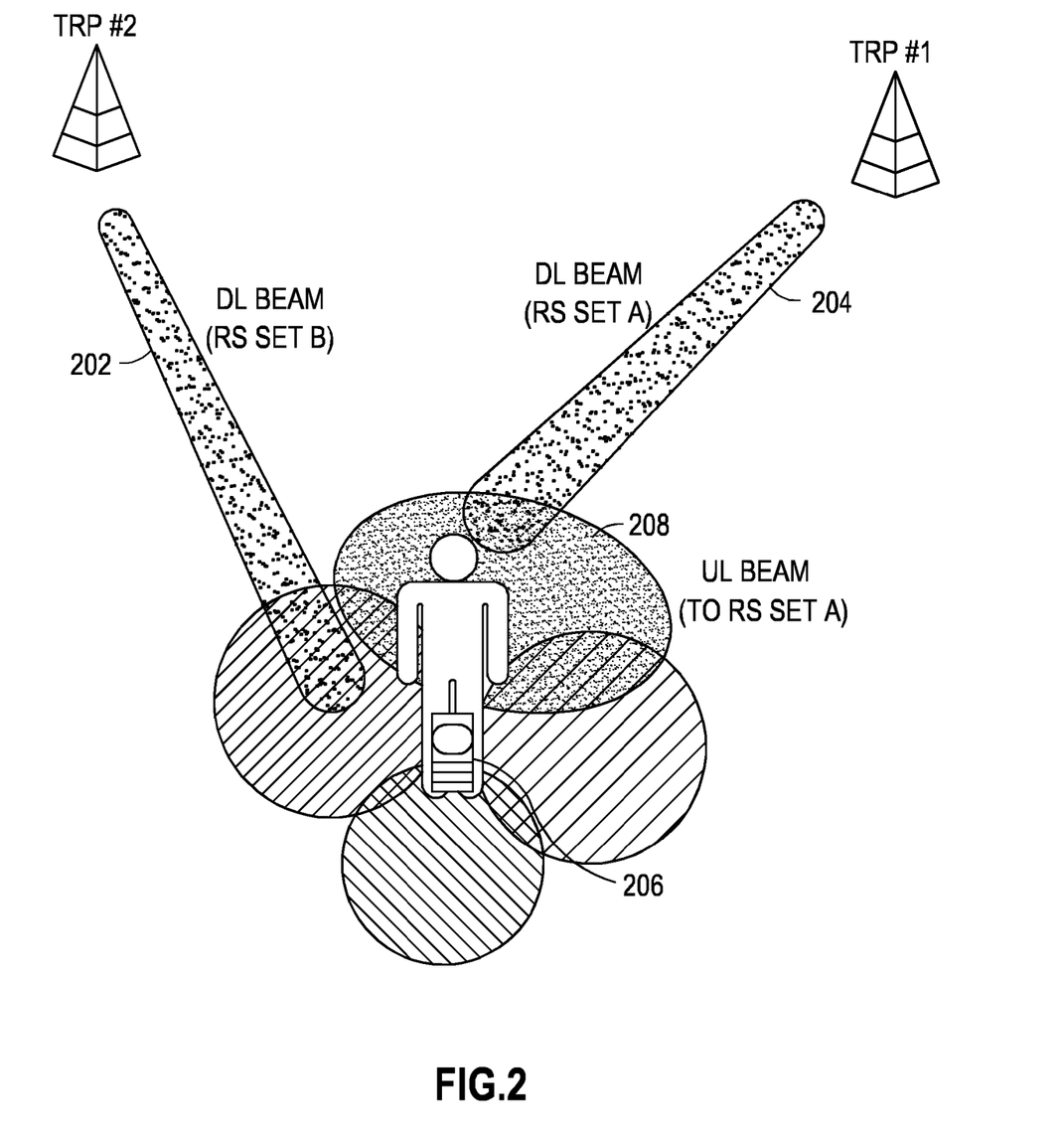
FIG. 2 schematically illustrates a second problem scenario addressed by the present invention.

In addition, as illustrated in FIG. 2, certain (DL) RS beams 202, 204 could be blocked by the body of a person with the UE 206 between the TX and corresponding (UE) RX beam. Depending on the propagation conditions, these beams could still have good observed RSRP, even assuming a loss of 3 dB in the body, resulting in a low path-loss (PL) estimate. Because the UE requires additional MPR (Maximum Power Reduction), P-MPR (Power Management Maximum Power Reduction), to meet emission-related requirements, such as electromagnetic energy absorption requirements, the actual achievable PL for a given UL resource allocation will be reduced compared to the level that could be estimated based on the DL RSRP. This could, together with the body loss, result in failure in UL beam 208.

It should be understood, both above and in the discussion to follow, that the term "gNB" should be understood to mean "network node". The term "gNB" is used to denote a network node in 5G. However, it should be understood that the present invention, as described below, is not limited to 5G, but may be applicable to other generations yet to be developed. As a consequence, "gNB" should be understood more broadly as a network node.

SUMMARY

In a first aspect of the present invention, a method comprises determining whether a downlink beam signal is being received from a base station; when the downlink beam signal is being received from the base station, determining whether a measurable property of the downlink beam signal does not meet a preselected threshold; when the downlink beam signal is not being received from the base station or when the measurable property of the downlink beam signal does not meet the preselected threshold, transmitting a message to the base station indicating that at least one uplink beam corresponding to the downlink beam has failed; and receiving a reply message from the base station with information required to determine a new uplink beam.

In a second aspect of the present invention, an apparatus comprises at least one processor; and at least one memory including computer program code, the at least one memory and the computer program code being configured, with the at least one processor, to cause the apparatus to perform the following: determine whether a downlink beam signal is being received from a base station; determine whether a measurable property of the downlink beam signal does not meet a preselected threshold, when the downlink beam signal is being received from the base station; transmit a message to the base station indicating that at least one uplink beam corresponding to the downlink beam has failed, when the downlink beam signal is not being received from the base station or when the measurable property of the downlink beam signal does not meet the preselected threshold; and receive a reply message from the base station with information required to determine a new uplink beam.

In a third aspect of the present invention, an apparatus comprises means for determining whether a downlink beam signal is being received from a base station; means for determining whether a measurable property of the downlink beam signal does not meet a preselected threshold, when the downlink beam signal is being received from the base station; means for transmitting a message to the base station indicating that at least one uplink beam corresponding to the downlink beam has failed, when the downlink beam signal is not being received from the base station or when the measurable property of the downlink beam signal does not meet the preselected threshold; and means for receiving a reply message from the base station with information required to determine a new uplink beam.

In a fourth aspect of the present invention, a computer program product comprises a non-transitory computer-readable storage medium bearing computer program code embodied therein for use with a computer, the computer program code comprising code for performing: determining whether a downlink beam signal is being received from a base station; determining whether a measurable property of the downlink beam signal does not meet a preselected threshold, when the downlink beam signal is being received from the base station; transmitting a message to the base station indicating that at least one uplink beam corresponding to the downlink beam has failed, when the downlink beam signal is not being received from the base station or when the measurable property of the downlink beam signal does not meet the preselected threshold; and receiving a reply message from the base station with information required to determine a new uplink beam.

In a fifth aspect of the present invention, a method comprises determining whether at least one uplink beam signal is being received from a user equipment; determining whether a measurable property of the at least one uplink beam signal does not meet a preselected threshold, when the at least one uplink beam signal is being received from the user equipment; and transmitting a message to the user equipment to initiate uplink beam recovery, when at least one uplink beam signal is not being received from the user equipment or when the measurable property of the at least one uplink beam signal does not meet the preselected threshold.

In a sixth aspect of the present invention, an apparatus comprises at least one processor; and at least one memory including computer program code, the at least one memory and the computer program code being configured, with the at least one processor, to cause the apparatus to perform the following: determine whether at least one uplink beam signal is being received from a user equipment; determine whether a measurable property of the at least one uplink beam signal does not meet a preselected threshold, when the at least one uplink beam signal is being received from the user equipment; and transmit a message to the user equipment to initiate uplink beam recovery, when the at least one uplink beam signal is not being received from the user equipment or when the measurable property of the at least one uplink beam signal does not meet the preselected threshold.

In a seventh aspect of the present invention, an apparatus comprises means for determining whether at least one uplink beam signal is being received from a user equipment; means for determining whether a measurable property of the at least one uplink beam signal does not meet a preselected threshold, when the at least one uplink beam signal is being received from the user equipment; and means for transmitting a message to the user equipment to initiate uplink beam recovery, when the at least one uplink beam signal is not being received from the user equipment or when the measurable property of the at least one uplink beam signal does not meet the preselected threshold.

In an eighth aspect of the present invention, a computer program product comprises a non-transitory computer-readable storage medium bearing computer program code embodied therein for use with a computer, the computer program code comprising code for performing: determining whether at least one uplink beam signal is being received from a user equipment; determining whether a measurable property of the at least one uplink beam signal does not meet a preselected threshold, when the at least one uplink beam signal is being received from the user equipment; and transmitting a message to the user equipment to initiate uplink beam recovery, when the at least one uplink beam signal is not being received from the user equipment or when the measurable property of the at least one uplink beam signal does not meet the preselected threshold.

BRIEF DESCRIPTION OF THE DRAWINGS

The foregoing and other aspects of these teachings are made more evident in the following detailed description, when read in conjunction with the attached drawing figures.

DETAILED DESCRIPTION

The present invention is directed toward methods and procedures for uplink beam failure detection and recovery.

In accordance with the present invention, the network, specifically a gNB, configures a contention-free/dedicated signal for indicating uplink beam failure recovery. The CFRA signal corresponds to at least one link with downlink only, that is, an active TCI state for PDCCH or PDSCH.

The transmission of the CFRA signal by the UE indicates to the network (gNB) both the UL failure and the new UL candidate that corresponds to the TCI state, that is, reference signal, for PDCCH or a reference signal with a spatial QCL-type D parameter of the TCI state activated for the PDCCH reception. Alternatively, the gNB itself can detect that the UL has failed.

The TCI state activated for the PDCCH reception, whose reference signal is not used for PUCCH as spatial relation information, comprising a reference signal to determine UL TX beam (the same DL RS is used as spatial source RS), may be mapped with an associated UL recovery link. In one alternative, the TCI state for PDCCH (or the reference signal) may be used as spatial relation information for PUSCH transmission but not for PUCCH, thus only the data channel is mapped to such uplink. This may also be one criteria to prioritize which existing link is considered to be new candidate UL beam (such as for control channel transmission) by a UE. In one example, when a UE determines that uplink beam failure has occurred, and it evaluates the links it can indicate with CFRA or CBRA signaling for recovery, it may prioritize links that have PUSCH mapped. Link selection may also take into account other parameters such as the DL RS quality (RSRP, RSRQ, SINR, hypothetical PDCCH BLER) associated with the dedicated CFRA signal or CBRA. CFRA and/or CBRA signals may be mapped to CSI-RS and/or SSB signals. Multiple metrics may be used in conjunction to evaluate, such as RSRP and SINR/BLER. As an example, first the candidates are evaluated based on RSRP, and the best candidates are estimated with a BLER-based metric. Also, UL power reduction may be taken into account. In one example, it may be possible to utilize similar TCI state framework, as used for PDCCH/PDSCH, for indicating QCL association of PUCCH/PUSCH DMRS to specific downlink RS (SSB, CSI-RS); thus, the TCI state would indicate PUCCH and/or PUSCH beam. Also, in TCI-based beam indication (uplink or downlink), for example, a specific signal, such as SSB, may not be directly indicated as TCI state for PDCCH, but it may be indicated through TRS (tracking reference signal) configuration; that is, SSB may be configured as TRS signal and the TRS may be indicated as active TCI state for PDCCH. In a similar manner, a CSI-RS signal may also be indirectly indicated as an active TCI state; that is, CSI-RS is configured as TRS signal, and, in TCI configuration, the TRS is indicated as active TCI state.

To determine UL beam failure, various ways may be used. For recovering downlink beam failure or uplink failure, different triggering conditions may be applied. In an example, if DL failure is determined using the set of q0, the UL failure may be estimated using the set of $q0_{uplink}$ which contains the RS respective to estimating UL beam failure. The failure condition of these sets may be determined independently, and different set signals may be triggered for recovery depending on which set was estimated to be in failure. As an example, specific set of signals (CFRA) can be used for indicating DL beam failure (and also the new candidate beam) and UL. In the UL case, the CFRA signals, as described herein, may be mapped to reference signals corresponding to TCI states for PDCCH or PDSCH (or PUSCH). Failure indication may be configured or specified to be indicated per set of q0 (either q0 or $q0_{uplink}$) condition. When all the RS in the set are considered to be in failure condition, the indication is provided by L1 to higher layers, such as MAC. MAC layer may run its own failure instance counter for each set (q0 or $q0_{uplink}$) to determine which type of failure has occurred and which signals to trigger recovery; that is, CFRA for UL recovery can only be triggered when UL beam failure has been declared. In one alternative, it could be enough to trigger (partial) UL failure indication on UL (if UE has multiple UL and one the UL fails) which is not in failure condition.

When the UE declares uplink beam failure, that is, as an example, when all the links that are used for UL (PUCCH and/or PUSCH) are considered to have failed based on measurements on downlink RS indicating that the UL link condition is either below quality threshold or the DL RS is not received/detected, assuming DL/UL beam reciprocity, the UE initiates BFR by sending msg1, which is a CFRA preamble dedicated for UL failure recovery.

UE msg1: The UE determines to select one of the active TCI states for PDCCH and to indicate it using the TCI state PDCCH specific CFRA signal. Or, in more general terms, it selects one candidate from the set of $q1_{uplink}$ (this refers to set of candidate beams, DL RS, that can be indicated using CFRA signals).

The UE assumes the spatial reference for gNB response to be the active TCI state for PDCCH that corresponds to the configured signal; it may or may not have a spatial relation to the msg1 transmission; that is, the CFRA signals that indicate specific candidate link for new UL control beam do not need to have correspondence to the indicated TCI state for PDCCH since the signal may carry this information implicitly through configuration.

gNB response: In case of UL failure, the gNB response on specific PDCCH link (or TCI state) may be considered as the new spatial relation information, that is, the reference signal to determine TX beam, for PUCCH. The gNB response may be simply a DCI message (which may indicate DL or UL grant) transmitted using C-RNTI.

Alternatively, the gNB may respond using a redirect command or indication to an alternative link after the UE has indicated UL BFR and received a response; the UE is required to perform a further CFRA procedure to the alternative link indicated by the gNB for UL beam failure recovery.

In some embodiments, the triggering of awareness of the uplink beam failure could be based solely on an observed level/quality on a downlink RS, such as threshold value for RSRP, signal-to-interference-and-noise ratio (SINR), and power level. In alternative embodiments, the uplink beam failure declaration could alternatively or in addition be based on uplink-related parameters.

For example, if UE determines that the available Power Head Room (PHR) would fall below a certain threshold, such as due to MPR, the UE could declare uplink beam failure.

In other examples, UE uplink beam failure could be based on a change on required MPR, exceeding certain threshold, and declare uplink beam failure or determine that an uplink beam is in failure condition and indicate failure instance to higher layers described herein.

In one example, the UL link (for example, based on measurements on DL RS) may be in non-failure condition, when MPR is not taken into account but when the MPR is used in calculating the transmission power available for specific UL direction, UL beam, the link may be considered to be in failure condition. Thus, in this case, the measurement on DL RS alone would not cause the UL link to be in failure condition, but together with transmission power reduction the link is in failure condition. In an aspect of the present invention, the UE may switch between CFRA and CBRA for UL beam recovery. Specifically, in one aspect of the invention, the UE may determine the UL recovery candidates based on the potential emission limits for the UL direction. In case the UE is not required/does not take into account the emission limits, it evaluates the candidates solely based on DL signal quality.

In case the current DL beam links (that the UE can use to indicate for recovery candidate using a CFRA signal) cannot provide sufficient signal level quality for UL communication, the UE switches to CBRA to indicate UL failure. Such emission limits may also be used to evaluate candidates that can be indicated using CBRA.

The signal quality threshold takes into account the DL signal quality of the candidate UL link, where the priority candidate UL links are the current DL links used for PDCCH, with the potential power back-off for the UL link direction; that is, the CFRA signals may be used when the signal quality of the candidate link is above specific threshold level (SINR, RSRP, RSRQ, or below the hypothetical PDCCH/PUCCH BLER threshold or the like), and the required power reduction is taken into account when evaluating the link against the threshold. In one example, when multiple CFRA signals are configured and the measurement of the associated DL RSs are above threshold with taking into account the UL power reduction/power back-off to estimate the UL link quality, the UE may select one of the signals or select the highest above the threshold level (or below in case BLER is a metric). In a similar manner, in general, when UE is evaluating the candidate links (or beams) for beam failure recovery (q0 or $q0_{uplink}$) either, it may take into account the UL power reduction/power back-off when evaluating candidate beams (which downlink RS would be indicated using CFRA/CBRA signals).

In another aspect of the present invention, the gNB can trigger UL recovery. Specifically, if the gNB determines UL beam failure, such as by not receiving a signal (PUCCH/PUSCH) from the UE, it may trigger UL recovery by a specific PDCCH command.

The PDCCH command may indicate to the UE to initiate specifically the UL beam recovery; in such a case, the UE assumes the DL configuration to be the same and tries to find new UL link.

gNB detected UL recovery may also be determined/initiated based on the measured quality UL reference signal transmitted by UE such as SRS (sounding reference signal). Quality may be evaluated based on RSRP/RSRQ, SINR, hypothetical PDCCH/PUCCH BLER, or the like.

In one aspect, the gNB configures the PDCCH in order to initiate UL recovery using CFRA signals to at least one link with DL only; alternatively, the NW may configure the UE with a CFRA resource corresponding to all DL links. For the gNB response, the UE monitors the existing DL links (TCI states) for the uplink recovery for the duration of the response window. Alternatively, if the CFRA signal does not map to any DL RS used as spatial relation for activated TCI state for PDCCH, the UE may monitor the response using the same spatial filter (beam) used for transmitting the request. Additionally or alternatively, if CBRA procedure is used, UE determines the spatial RX filter for gNB response based on the transmission spatial filter.

Alternatively, the response window may not apply and the UE monitors the gNB response on current DL only links that are not in a failure condition.

For the gNB response, UE may consider either the new TCI State for PUCCH or specific DCI format transmitted with C-RNTI.

Additionally, and not specifically related to gNB-initiated recovery, if the UE cannot use the CFRA to indicate any of the DL beams (downlink beams with activated TCI state for PDCCH, PSDCH or the reference signal used as spatial relation for PUSCH) to be the new UL, it switches to CBRA. In this case, the UE may indicate in the uplink message, either msg1 (CBRA preambles are mapped for UL BFR purposes) or msg3 that this is recovery for UL specifically. This indicates to the network that downlink is not in failure condition and thus reconfiguration of PDCCH/PDSCH may not be needed to due to UL failure.

If the UE is not able to initiate RA procedure, or the RA procedure fails due to maximum power requirement for UL, it may trigger radio link failure, that is, indicate the RACH failure to RRC.

In general, a CFRA signal may be mapped to a synchronization signal (SS) block or to CSI-RS signals. Transmission of a signal indicates the associated downlink RS to the network. CBRA signals may also be mapped to SSBs or CSI-RS signals. Also, in one example, CSI-RS may be indicated using a CFRA signal, but the preamble signal is associated to SSB (indication is through QCL assumption of CSI-RS and SSB).

In case of partial UL failure, if the UE has another UL link with SR/PUCCH configuration, it may indicate the partial UL failure using a specific MAC CE or PUCCH signaling. In this case, MAC/L1 may indicate whether a specific UL link index, or the corresponding DL RS, is in a failure condition from UL perspective.

In one aspect, the CFRA update for $q1_{uplink}$ (set of dedicated signals for indicating UL beam failure) may be updated by the network when the PDCCH configuration/new PDCCH TCI states are activated. In this manner, the CFRA signal can be configured to correspond to the DL RS of the active TCI state for PDCCH. Alternatively, if the CFRA signal configuration is not updated, it may be mapped in sequence to the existing PDCCH links. That is to say, if a UE has two active TCI states for PDCCH and two CFRA signals are listed in the set and different TCI states are activated, the CFRA signals are mapped to the new active TCI states although there may not be any spatial relation for the DL RS associated with CFRA signal and the active TCI state. Alternatively, the spatial relation is fixed in a manner that the CFRA signal indicates specific candidate for UL recovery although it does not correspond to any active TCI state for PDCCH.

In one implementation aspect, if the DL RS corresponding to PUCCH (or PUSCH) differs from active PDCCH TCI states, the UE may determine to include the downlink RS resource indexes in a set of $q0_{uplink}$ (set of failure detection reference signals for uplink). In another aspect, UE determines implicitly to include the DL RS to the failure detection set of $q0_{uplink}$ based on the PUCCH configuration by the network (UE is configured for the PUCCH with spatial relation information to DL RS). This set is used for UL failure detection. The failure detection set can also be configured explicitly. UE may also determine to include the DL RS corresponding to PUCCH/PUSCH channel implicitly (based on TCI state activation or when PUCCH beam is determined based on the indicated spatial relation to specific DL RS) to either the q0 or $q0_{uplink}$. That is, the uplink specific DL RS may be part of the beam failure set q0, in this case the DL and UL beams are not differentiated in the failure detection or they may have separate sets, named as an example q0 and $q0_{uplink}$. Alternatively or additionally, UE may be configured with any two or more sets for failure detection where the failure detection is determined per set of failure detection reference signals.

Beam failure monitoring may be done separately at the MAC layer for the UL and DL direction, if the BFD-RS sets are different (q0 and $q0_{uplink}$).

MAC layer determines either UL or DL failure (or both) and initiates recovery.

A different procedure (different signals or indications) may apply when either q0 (PDCCH links) or $q0_{uplink}$ (PUCCH or PUSCH) links are in failure.

Figure 3:
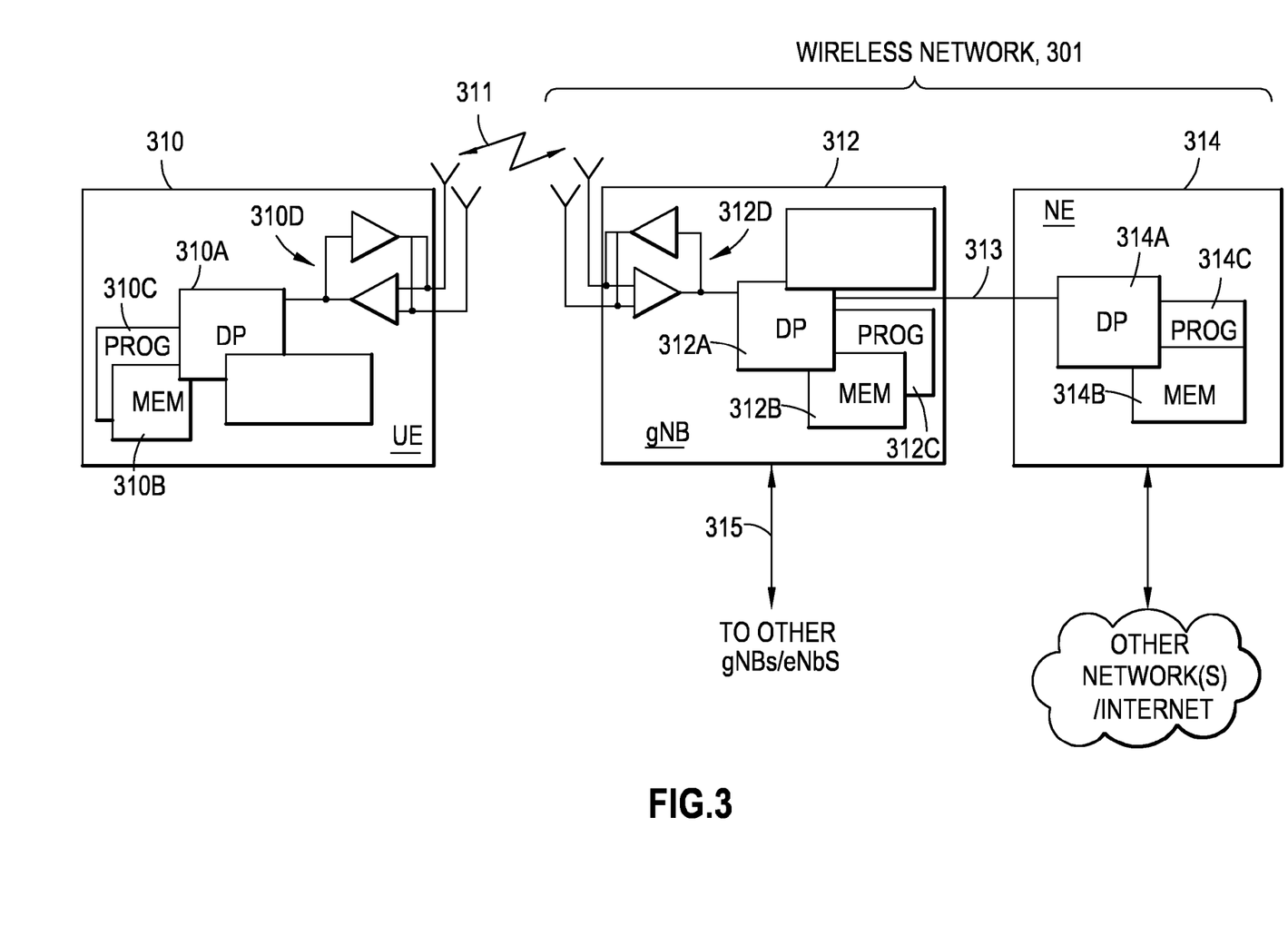
FIG. 3 shows a simplified block diagram of certain apparatus according to various exemplary embodiments of the present invention.

Reference is now made to FIG. 3 for illustrating a simplified block diagram of various electronic devices and apparatus that are suitable for use in practicing an exemplary embodiment of the present invention. In FIG. 3, a wireless network 301 is adapted for communication over a wireless link 311 with an apparatus, such as a mobile communication device, which is referred to as a UE 310, via a wireless network access node, such as a base station or relay station or remote radio head, and more specifically shown as a gNodeB (gNB) 312. The network 301 may include a network element 314, which serves as a gateway to a broader network, such as a public switched telephone/data network and/or the Internet.

The UE 310 includes a controller, such as a computer or a data processor (DP) 310A, a computer-readable memory medium embodied as a memory (MEM) 310B, which stores a program of computer instructions (PROG) 310C, and a suitable radio frequency (RF) transmitter and receiver 310D for bi-directional wireless communications with the gNodeB (gNB) 312 via one or more antennas. The gNodeB 312 also includes a controller, such as a computer or a data processor (DP) 312A, a computer-readable memory medium embodied as a memory (MEM) 312B that stores a program of computer instructions (PROG) 312C, and a suitable RF transmitter and receiver 312D for communication with the UE 310 via one or more antennas. The gNodeB 312 is coupled via a data/control path 313 to the network element 314. The path 313 may be implemented as an S1 interface when the network 301 is an LTE network. The gNodeB 312 may also be coupled to another gNodeB or to an eNodeB via data/control path 315, which may be implemented as an X2 interface when the network 301 is an LTE network.

At least one of the PROGs 310C and 312C is assumed to include program instructions that, when executed by the associated DP, enable the device to operate in accordance with the exemplary embodiments of this invention. That is, the exemplary embodiments of this invention may be implemented at least in part by computer software executable by the DP 310A of the UE 310 and/or by the DP 312A of the gNodeB 312, or by hardware, or by a combination of software and hardware (and firmware).

In general, the various embodiments of the UE 310 can include, but are not limited to, cellular telephones; personal digital assistants (PDAs) having wireless communication capabilities; portable computers having wireless communication capabilities; image capture devices, such as digital cameras, having wireless communication capabilities; gaming devices having wireless communication capabilities; music storage and playback appliances having wireless communication capabilities; and Internet appliances permitting wireless Internet access and browsing, as well as portable units or terminals that incorporate combinations of such functions.

The computer-readable MEMs 310B and 312B may be of any type suitable to the local technical environment and may be implemented using any suitable data storage technology, such as semiconductor-based memory devices, flash memory, magnetic-memory devices and systems, optical-memory devices and systems, fixed memory and removable memory. The DPs 310A and 312A may be of any type suitable to the local technical environment, and may include one or more of general purpose computers, special purpose computers, microprocessors, digital signal processors (DSPs) and processors based on a multicore processor architecture, as non-limiting examples.

It should be noted that the various DPs 310A, 312A may be implemented as one or more processors/chips, either or both of the UE 310 and the gNodeB 312 may include more than one transmitter and/or receiver 310D, 312D, and particularly the gNodeB 312 may have its antennas mounted remotely from the other components of the gNodeB 312, such as for example tower-mounted antennas.

Figure 4:
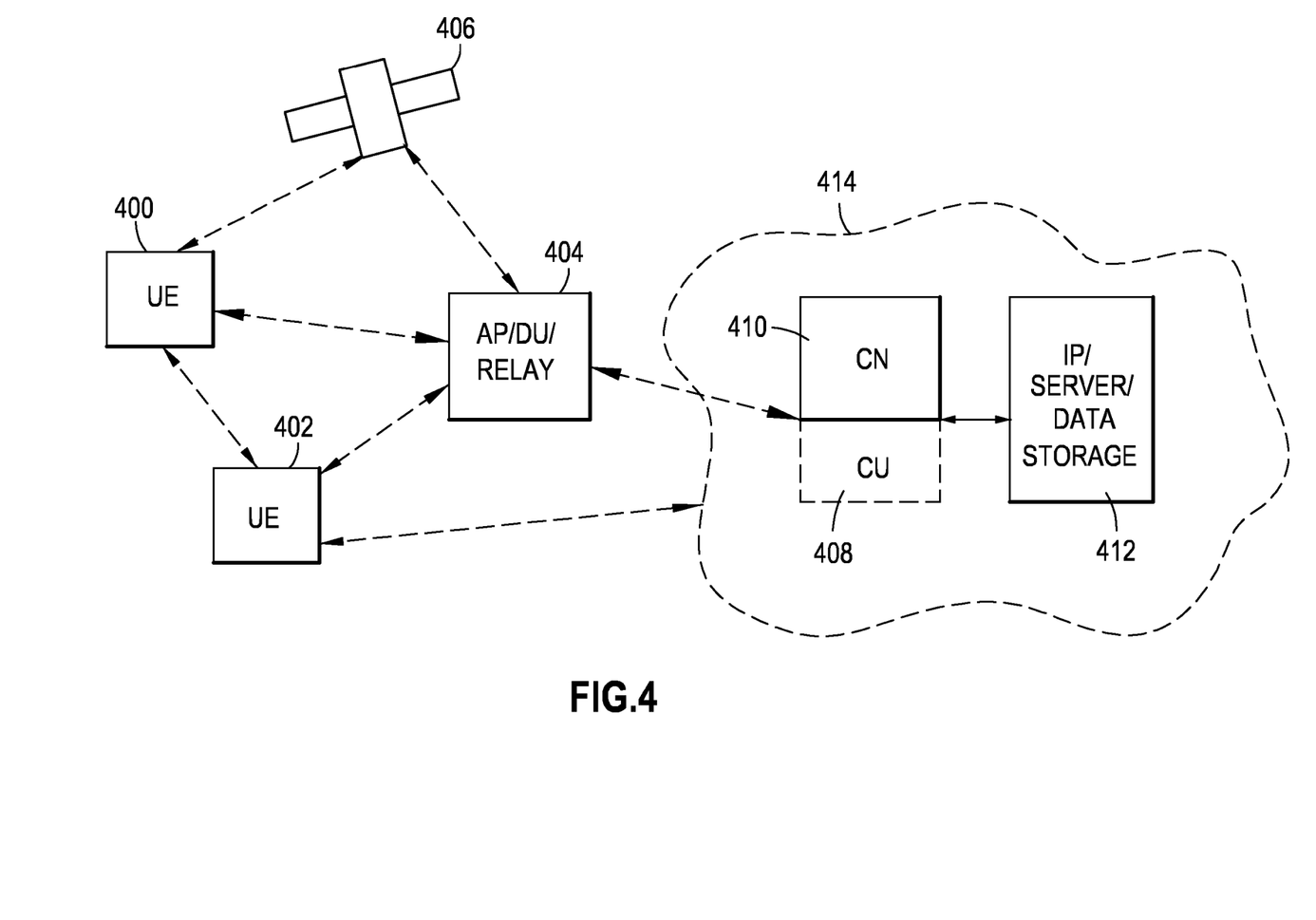
FIG. 4 shows part of another exemplary radio network.

Reference is now made to FIG. 4 for illustrating a simplified block diagram of various electronic devices and apparatus that are suitable for use in practicing another exemplary embodiment of the present invention. In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), and Internet Protocol multimedia subsystems (IMS) or any combination thereof.

FIG. 4 depicts examples of simplified system architectures only showing some elements and functional entities, all being logical units, whose implementation may differ from what is shown. The connections shown in FIG. 4 are logical connections; the actual physical connections may be different. It is apparent to a person skilled in the art that the system typically comprises also other functions and structures than those shown in FIG. 4.

The embodiments are not, however, restricted to the system given as an example, but a person skilled in the art may apply the solution to other communication systems provided with necessary properties.

The example of FIG. 4 shows a part of an exemplifying radio access network.

FIG. 4 shows user devices 400 and 402 configured to be in a wireless connection on one or more communication channels in a cell with an access node (such as (e/g)NodeB) 404 providing the cell. The physical link from a user device to a/an (e/g)NodeB is called uplink or reverse link and the physical link from the (e/g)NodeB to the user device is called downlink or forward link. It should be appreciated that (e/g)NodeBs or their functionalities may be implemented by using any node, host, server, or access point, etc., entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system to which it is coupled. The NodeB may also be referred to as a base station, an access point, or any other type of interfacing device including a relay station capable of operating in a wireless environment. The (e/g) NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 410 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in an Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 4, user devices may include two antennas. The number of reception and/or transmission antennas may naturally vary according to a current implementation.

Additionally, although the apparatuses have been depicted as single entities, different units, processors and/or memory units (not all shown in FIG. 4) may be implemented.

5G enables the use of multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC)), including vehicular safety, different sensors and real-time control. 5G is expected to have multiple radio interfaces, namely below 6 GHz, cm-Wave and mm-Wave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cm-Wave, below 6 GHz—cm-Wave—mm-Wave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies, such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 412, or utilize services provided by them. The communication network may also be able to support the usage of cloud services, for example, at least part of core network operations may be carried out as a cloud service (this is depicted in FIG. 4 by "cloud" 414). The communication system may also comprise a central control entity, or the like, providing facilities for networks of different operators to cooperate, for example, in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 404) and non-real time functions being carried out in a centralized manner (in a centralized unit, CU 408).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example, by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 406 in the mega-constellation may cover several satellite-enabled network entities that create on-ground cells. The on-ground cells may be created through an on-ground relay node 404 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs may be a Home (e/g)nodeB. Additionally, in a geographical area of a radio communication system, a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 4 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 4). An HNB Gateway (HNB-GW), which is typically installed within an operator's network may aggregate traffic from a large number of HNBs back to a core network.

Figure 5:
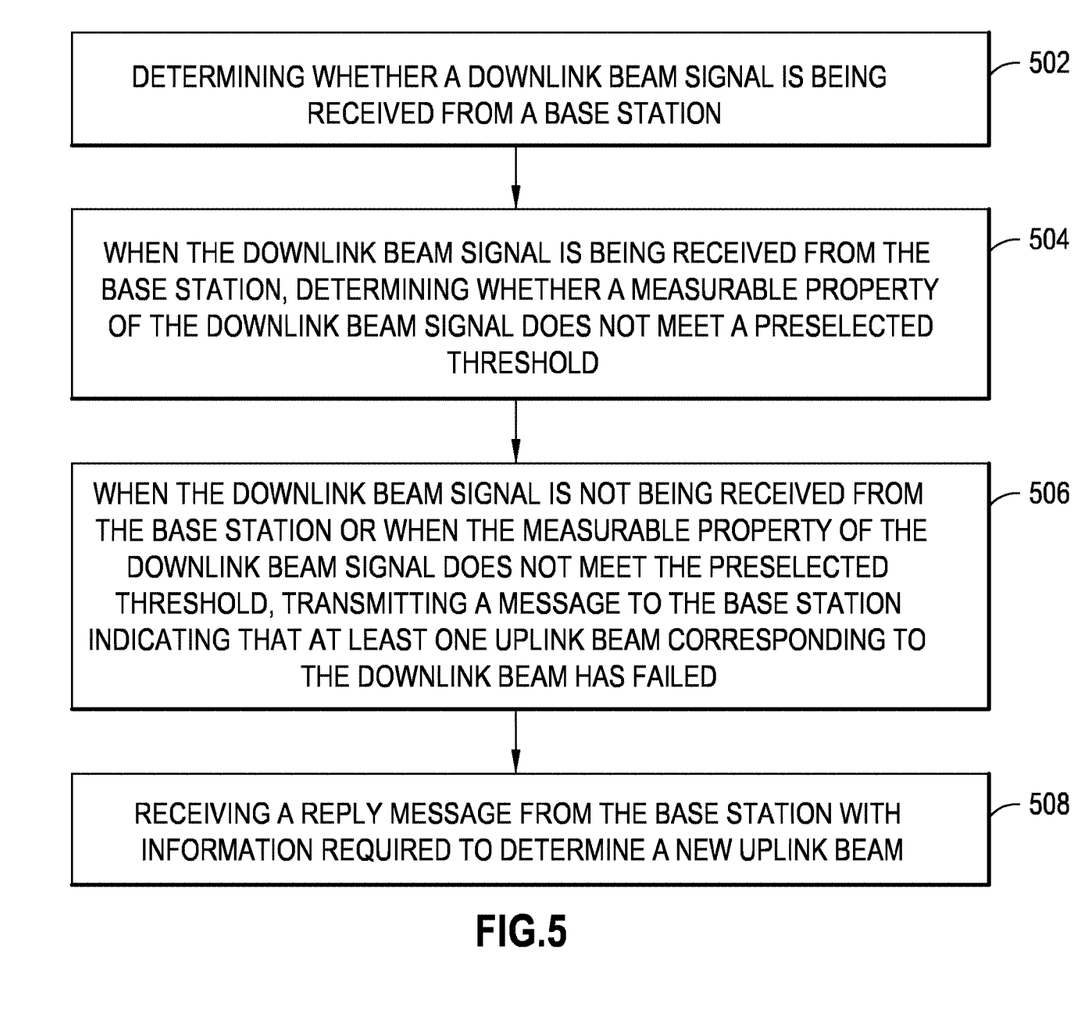
FIG. 5 is a flow chart illustrating a method performed by a user equipment in accordance with the present disclosure.

FIG. 5 is a flow chart illustrating a method performed by a user equipment in accordance with the present disclosure. In block 502, the user equipment determines whether a downlink beam signal is being received from a base station. In block 504, the user equipment determines whether a measurable property of the downlink beam signal does not meet a preselected threshold when the downlink beam signal is being received from the base station. In block 506, the user equipment transmits a message to the base station indicating that at least one uplink beam corresponding to the downlink beam has failed, when the downlink beam signal is not being received from the base station or when the measurable property of the downlink beam signal does not meet the preselected threshold. In block 508, the user equipment receives a reply message from the base station with information required to determine a new uplink beam.

Figure 6:
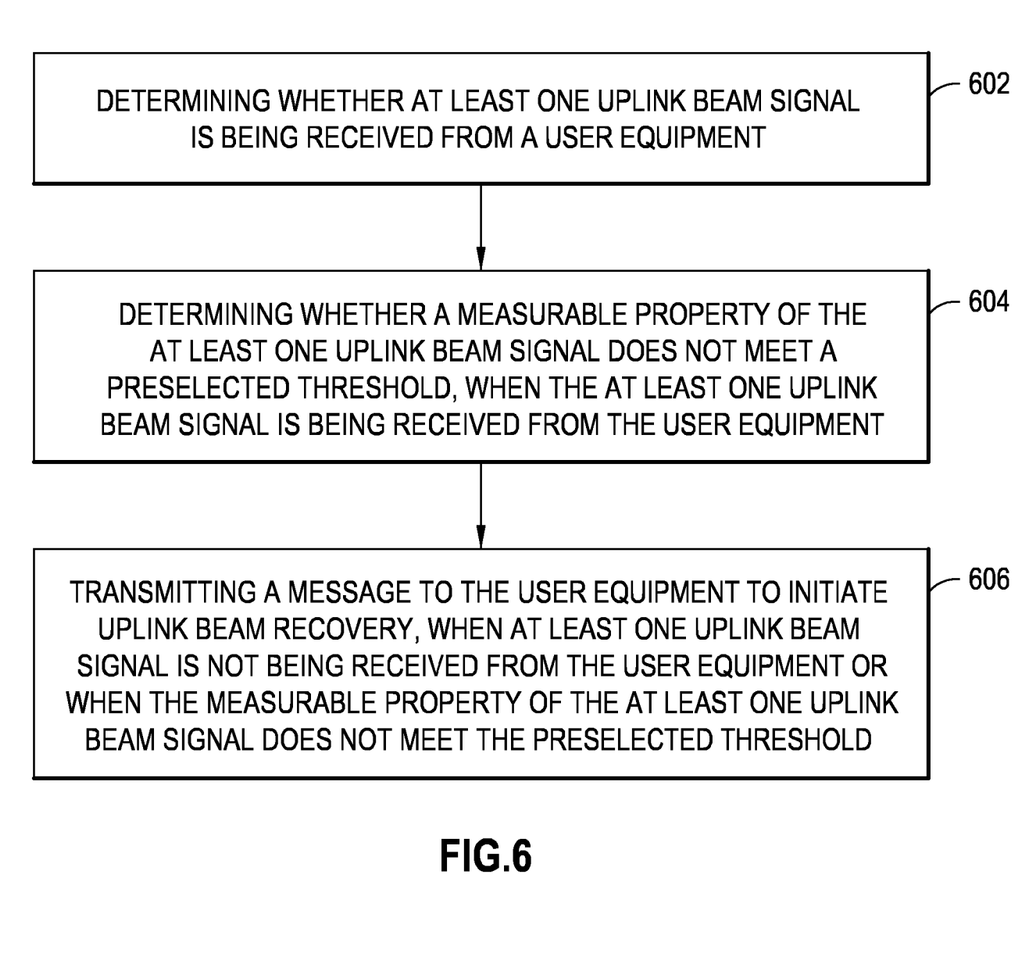
FIG. 6 is a flow chart illustrating a method performed by a base station in accordance with the present disclosure.

FIG. 6 is a flow chart illustrating a method performed by a base station in accordance with the present disclosure. In block 602, the base station determines whether at least one uplink beam signal is being received from a user equipment. In block 604, the base station determines whether a measurable property of the at least one uplink beam signal does not meet a preselected threshold, when the at least one uplink beam signal is being received from the user equipment. In block 606, the base station transmits a message to the user equipment to initiate uplink beam recovery, when at least one uplink beam signal is not being received from the user equipment or when the measurable property of the at least one uplink beam signal does not meet the preselected threshold.

In general, the various exemplary embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although the invention is not limited thereto.

While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components, such as integrated circuit chips and modules, and that the exemplary embodiments of this invention may be realized in an apparatus that is embodied as an integrated circuit. The integrated circuit, or circuits, may comprise circuitry, as well as possibly firmware, for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. For example, while the exemplary embodiments have been described above in the context of advancements to the 5G NR system, it should be appreciated that the exemplary embodiments of this invention are not limited for use with only this one particular type of wireless communication system. The exemplary embodiments of the invention presented herein are explanatory and not exhaustive or otherwise limiting of the scope of the invention.

The following abbreviations have been used in the preceding discussion:
BFD-RS Beam Failure Detection—Reference Signal
BFI Beam Failure Instance
BFR Beam Failure Recovery
BFRQ Beam Failure Recovery ReQuest
BFRR Beam Failure Recovery Request
BLER Block Error Rate
CBRA Contention-Based Random Access
CE Control Element
CFRA Contention-Free Random Access
CORESET Control Resource Set
C-RNTI Cell Radio Network Temporary Identifier
CSI Channel State Information
DCI Downlink Control Information
DL Downlink
DMRS Demodulation Reference Signal
GHz Gigahertz
gNB gNodeB
L1 Layer 1
MAC Medium Access Control
MPR Maximum Power Reduction
NR New Radio
NW Network
OOS/Qout Out of Sync/Quality Threshold for Out of Sync
PA Power Amplifier
PBCH Physical Broadcast Channel
PDCCH Physical Downlink Control Channel
PDSCH Physical Downlink Shared Channel
PHR Powerhead Room
PHY Physical Layer
PL Path Loss
P-MPR Power Management Maximum Power Reduction
PRACH Physical Random Access Channel
PUCCH Physical Uplink Control Channel
PUSCH Physical Uplink Shared Channel
QCL Quasi Co-location
QCL-Type D Quasi Co-location Type D
q0 Set of Reference Signals for Monitoring Link Quality
q1 Set of Candidate Beam Reference Signals
RAR Random Access Response
RA-RNTI Random Access Radio Network Temporary Identifier
RF Radio Frequency
RRC Radio Resource Control
RS Reference Signal
RSRP Reference Signal Received Power
RSRQ Reference Signal Received Quality
RX Receiver
SR Scheduling Request
SS Synchronization Signal
SSB Synchronization Signal Block
SS/PBCH Synchronization Signal Physical Broadcast Channel
TCI Transmission Configuration Indication
TRP Transmission/Reception Point
TRS Tracking Reference Signal
TX Transmitter
UE User Equipment
UL Uplink
3GPP $3^{rd}$ Generation Partnership Project
5G $5^{th}$ Generation The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various modifications and adaptations may become apparent to those skilled in the relevant arts in view of the foregoing description, when read in conjunction with the accompanying drawings. However, any and all modifications of the teachings of this disclosure will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the claims to follow.

What is claimed is:

1. A method comprising:
    determining whether a downlink beam signal is being received from a base station;
    when the downlink beam signal is being received from the base station, determining that a measurable property of the downlink beam signal does not meet a preselected threshold;
    based on the determining, transmitting a contention-free random access (CFRA) preamble signal to the base station, the CFRA signal comprising:
        an indication that at least one uplink beam corresponding to the downlink beam has failed, the CFRA preamble signal corresponding to at least one link with downlink only that is indicated as an active transmission configuration indication (TCI) state for a physical downlink control channel (PDCCH); and
        an indication of a new uplink candidate that corresponds a reference signal with a spatial quasi co-location type D (QCL-Type D) parameter of the TCI state activated for the PDCCH reception, wherein the new uplink candidate is selected based on a signal quality of the downlink, Reference Signal Received Power (RSRP), Reference Signal Received Quality (RSRQ), Signal-To-Interference-And-Noise Ratio (SINR), and hypothetical PDCCH block error rate associated with the CFRA signal; and providing an indication that the new uplink candidate is the new uplink.

2. The method of claim 1, wherein the measurable property comprises the signal quality of the downlink, RSRP, RSRQ, SINR, and the hypothetical PDCCH block error rate evaluated for physical uplink control channel or physical downlink control channel.

3. The method of claim 1, wherein the downlink beam signal is being received by user equipment from the base station.

4. The method of claim 3, wherein the user equipment determines that a measurable property of the downlink beam signal does not meet a preselected threshold.

5. The method of claim 1, wherein the base station is a gNB network node.

6. The method of claim 1, wherein uplink power reduction is taken into account when determining at least one of uplink beam failure and the new uplink candidate for the new uplink beam.

7. The method of claim 1, wherein the measurable property further comprises calculating a maximum power reduction or power head room for the at least one uplink beam corresponding to the downlink beam.

8. An apparatus comprising at least one non-transitory memory and at least one processor, the at least one memory storing computer executable instructions which, when performed with the at least one processor, cause the apparatus to:
determine whether a downlink beam signal is being received from a base station;
when the downlink beam signal is being received from the base station, determine that a measurable property of the downlink beam signal does not meet a preselected threshold;
based on the determining, transmit a contention-free random access (CFRA) preamble signal to the base station, the CFRA signal comprising:
an indication indicating that at least one uplink beam corresponding to the downlink beam has failed, the CFRA preamble signal corresponding to at least one link with downlink only that is indicated as an active transmission configuration indication (TCI) state for a physical downlink control channel (PDCCH); and
an indication of a new uplink candidate that corresponds a reference signal with a spatial quasi co-location type D (QCL-Type D) parameter of the TCI state activated for the PDCCH reception, wherein the new uplink candidate is selected based on a signal quality of the downlink, Reference Signal Received Power (RSRP), Reference Signal Received Quality (RSRQ), Signal-To-Interference-And-Noise Ratio (SINR), and hypothetical PDCCH block error rate associated with the CFRA signal; and provide an indication that the new uplink candidate is the new uplink.

9. The apparatus of claim 8, wherein the measurable property comprises the signal quality of the downlink, RSRP, RSRQ, SINR, and the hypothetical PDCCH block error rate evaluated for physical uplink control channel or physical downlink control channel.

10. The apparatus of claim 9, wherein the measurable property further comprises calculating a maximum power reduction.

11. The apparatus of claim 10, wherein the apparatus is user equipment and the downlink beam signal is being received by the user equipment from the base station.

12. The apparatus of claim 11, wherein the measurable property further comprises calculating power head room for the at least one uplink beam corresponding to the downlink beam.

13. The apparatus of claim 8, wherein the base station is a gNB network node.

14. The apparatus of claim 8, wherein uplink power reduction is taken into account when determining at least one of uplink beam failure or a candidate for the new uplink beam.

15. A non-transitory computer-readable medium comprising computer-executable instructions that, when executed by at least one processor, cause the at least one processor to perform the following operations:
determine that at least one uplink beam signal is being received;
determine that a measurable property of the at least one uplink beam signal does not meet a preselected threshold; and
based on determining that the measurable property of the at least one uplink beam signal does not meet the preselected threshold, transmit a contention-free random access (CFRA) preamble signal to the base station, the CFRA signal comprising:
an indication that at least one uplink beam corresponding to the downlink beam has failed, the CFRA preamble signal corresponding to at least one link with downlink only that is indicated as an active transmission configuration indication (TCI) state for a physical downlink control channel (PDCCH); and
an indication of a new uplink candidate that corresponds a reference signal with a spatial quasi co-location type D (QCL-Type D) parameter of the TCI state activated for the PDCCH reception, wherein the new uplink candidate is selected based on a signal quality of the downlink, Reference Signal Received Power (RSRP), Reference Signal Received Quality (RSRQ), Signal-To-Interference-And-Noise Ratio (SINR), and hypothetical PDCCH block error rate associated with the CFRA signal; and provide an indication that the new uplink candidate is the new uplink.

16. The non-transitory computer-readable medium of claim 15, wherein the measurable property comprises the signal quality of the downlink, RSRP, RSRQ, SINR, and the hypothetical PDCCH block error rate evaluated for physical uplink control channel or physical downlink control channel.

17. The non-transitory computer-readable medium of claim 15, wherein the downlink beam signal is being received by user equipment from the base station.

18. The non-transitory computer-readable medium of claim 17, wherein the the user equipment comprises the at least one processor.

19. The non-transitory computer-readable medium of claim 15, wherein uplink power reduction is taken into account when determining at least one of uplink beam failure and the new uplink candidate for the new uplink beam.

20. The non-transitory computer-readable medium of claim 15, wherein the measurable property further comprises calculating a maximum power reduction or power head room for the at least one uplink beam corresponding to the downlink beam.

\* \* \* \* \*